(12) United States Patent
Ham (10) Patent No.: US 8,882,322 B2
(45) Date of Patent: Nov. 11, 2014

(54) BACKLIGHT UNIT

(75) Inventor: Sungchul Ham, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 252 days.

(21) Appl. No.: 13/473,701

(22) Filed: May 17, 2012

(65) Prior Publication Data

US 2012/0307522 A1    Dec. 6, 2012

(30) Foreign Application Priority Data

May 31, 2011  (KR) .................. 10-2011-0052266

(51) Int. Cl.
*F21V 7/04*    (2006.01)
*F21V 8/00*    (2006.01)

(52) U.S. Cl.
CPC .............. *G02B 6/002* (2013.01); *G02B 6/0046* (2013.01); *G02B 6/0068* (2013.01); *G02B 6/005* (2013.01)
USPC .............................. 362/609; 362/608; 362/612

(58) Field of Classification Search
CPC .......................... F21Y 2101/02; G02B 6/0068
USPC .......................... 362/609, 608, 612, 613, 632
See application file for complete search history.

(56) References Cited

U.S. PATENT DOCUMENTS 5,128,781 A      7/1992   Ohno et al. ................... 359/48
2010/0182540 A1  7/2010   Mifune et al. ................. 349/65

FOREIGN PATENT DOCUMENTS

EP          1 992 870 A2     11/2008

OTHER PUBLICATIONS

European Search Report dated Sep. 4, 2012 issued in Application No. 12 16 8733.

*Primary Examiner* — Vip Patel
(74) *Attorney, Agent, or Firm* — Ked & Associates, LLP (57) ABSTRACT

A backlight unit is provided. The backlight unit may include a light emitting device package, a light guide plate including a first region and a second region extending from the first region, with upper surfaces of the first and second regions being spaced apart so as to form a stepped surface. A recess may be formed in a lateral surface of the second region to receive the light emitting device package, and an optical sheet may be received on the upper surface of the second region of the light guide plate.

19 Claims, 8 Drawing Sheets

BACKLIGHT UNIT

CROSS-REFERENCE TO RELATED APPLICATION

This application claims the priority benefit of Korean Patent Application No. 10-2011-0052266, filed on May 31, 2011 in the Korean Intellectual Property Office, the disclosure of which is incorporated herein by reference.

BACKGROUND

1. Field

Embodiments relate to a backlight unit.

2. Description of the Related Art

Light Emitting Diodes (LEDs) are devices which convert electric signals into light using characteristics of compound semiconductors. Such LEDs are being utilized in home appliances, remote controllers, electric bulletin boards, displays and various other automated machines and the application range thereof is gradually increasing.

A backlight unit using light emitting diodes may be used in display apparatuses, such as liquid crystal display apparatuses and also, may be used in lights in a variety of fields. In general, a backlight unit includes a light source, a light guide plate configured to diffuse light emitted from the light source, and optical sheets which function to diffuse or condense light emitted from the light guide plate.

Light emitting diodes, which are operated at a low voltage and exhibit high efficiency, are usable as the light source of the backlight unit. Such a light emitting diode is a 2-terminal device containing a compound semiconductor, such as Gallium Arsenide (GaAs), Gallium Nitride (GaN), Indium Gallium Nitride (InGaN) or the like. When power is applied to a cathode terminal and an anode terminal of the light emitting diode, the light emitting diode emits visible light generated upon electron-hole coupling.

Backlight units are classified into an edge type backlight unit and a vertical type backlight unit according to positions of light sources.

The edge type backlight unit is mainly applicable to a relatively small scale liquid crystal display apparatus, such as a monitor of a desktop computer and a laptop computer. Such an edge type backlight unit exhibits improved light uniformity and long lifespan and is advantageous to achieve a slim design of the liquid crystal display apparatus.

In the case of a backlight unit using light emitting devices, it is necessary to guide light generated from the light emitting devices in a predetermined direction and to ensure uniform light emission throughout a display region of the backlight unit. In addition, slimness and light weight of the backlight unit are important problems, in order to enhance productivity and user convenience.

SUMMARY

Embodiments provide a backlight unit in which a light guide plate has a stepped upper surface and an optical sheet is placed on a part of the stepped upper surface having a lower height than the remaining part, which may reduce a gap between the light guide plate and the optical sheet so as to achieve a reduced product volume and may reduce light leakage, providing the backlight unit with enhanced reliability in light emission.

In one embodiment, a backlight unit includes a light emitting device package, a light guide plate including a first region, which has a recess indented in a lateral surface thereof adjacent to the light emitting device package, and a second region, an upper surface of which is stepped from an upper surface of the first region, and an optical sheet placed on the upper surface of the second region.

BRIEF DESCRIPTION OF THE DRAWINGS

Details of the embodiments will be more clearly understood from the following detailed description taken in conjunction with the accompanying drawings, in which.

DETAILED DESCRIPTION OF EMBODIMENTS

Prior to description of the embodiments, it will be understood that, when an element, such as a layer (film), region, pattern or structure, is referred to as being formed "on" or "under" another element, such as a substrate, layer (film), region, pad or pattern, it can be directly "on" or "under" the other element or be indirectly formed with intervening elements therebetween. Further, "on" or "under" the element will be described based on illustration in the drawings.

In the drawings, the thickness or size of each layer is exaggerated, omitted or schematically illustrated for clarity and convenience of description. In addition, the size of each element does not wholly reflect actual size thereof.

Hereinafter, embodiments will be described in more detail with reference to the accompanying drawings.

Figure 1A:
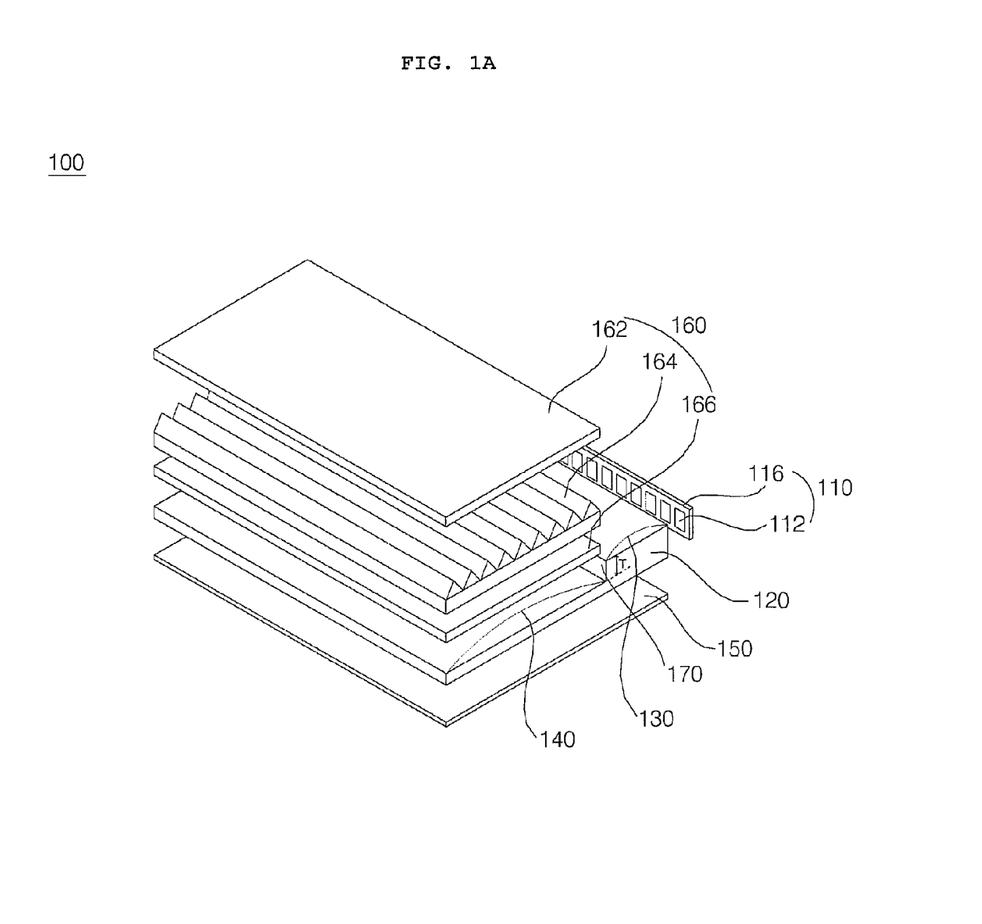
FIG. 1A is an exploded perspective view showing a backlight unit in accordance with an embodiment.
Figure 1B:
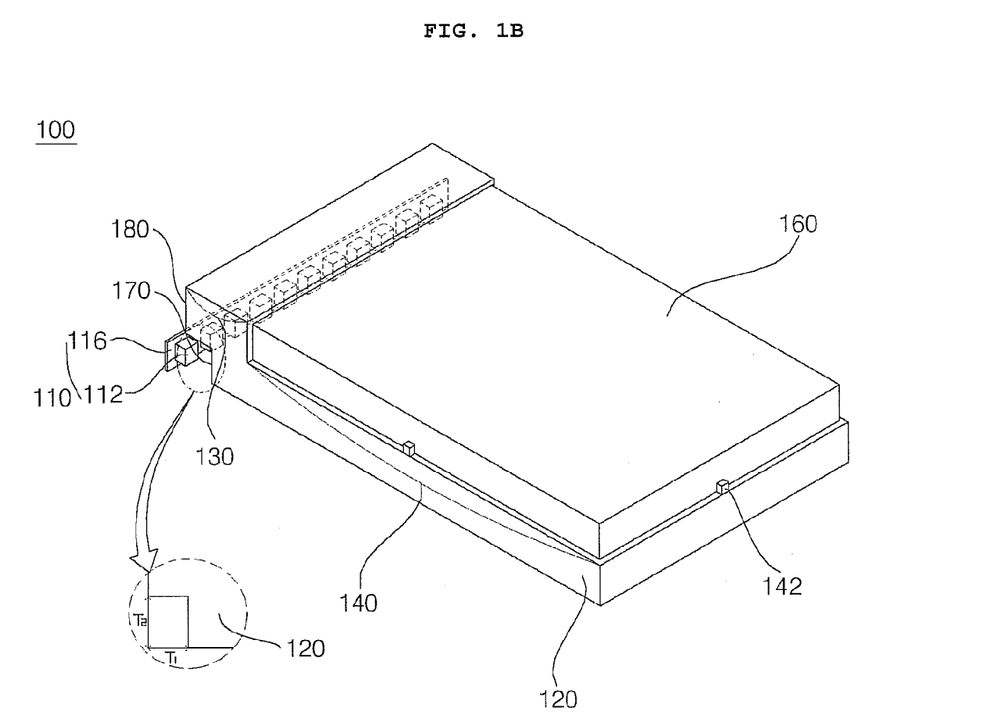
FIG. 1B is a partially exploded perspective view of a backlight unit in accordance with an embodiment.

FIG. 1A is an exploded perspective view showing a backlight unit 100 in accordance with an embodiment, and FIG. 1B is a partially exploded perspective view of the backlight unit 100 in accordance with an embodiment.

Referring to FIGS. 1A and 1B, the backlight unit 100 in accordance with the embodiment is of an edge light type, and includes at least one light emitting device package 112, a light guide plate 120 and an optical sheet 160. In the embodiment, the light guide plate 120 includes a first region 130, which may have a recess 170 indented in a lateral surface thereof adjacent to the light emitting device package 112, and a second region 140, an upper surface of which is stepped from an upper surface of the first region 130. The optical sheet 160 is placed on the upper surface of the second region 140.

The backlight unit 100 serves to supply light to a liquid crystal display apparatus (not shown) and may be located at a rear surface of the liquid crystal display apparatus (not shown). The backlight unit 100 may supply high brightness light to the liquid crystal display apparatus (not shown) within an appropriate viewing angle range.

The light emitting device package 112 may be arranged on a printed circuit board 116 to thereby constitute a light emitting device module 110. The light emitting device module 110 may be oriented in a direction intersecting with a reflective sheet 150 in such a way that a light emitting surface of the light emitting device package 112 arranged on the printed circuit board 116 faces the light guide plate 120. In one example, the light emitting device module 110 may be oriented such that the light emitting surface of the light emitting device package 112 faces a lateral surface of the light guide plate 120. In other words, a surface of the light emitting device module 110, at which the light emitting device package 112 is provided, may face the light guide plate 120. In one example, an upper surface of the light emitting device module 110, on which the light emitting device package 112 is mounted, may be parallel to the lateral surface of the light guide plate 120. As such, light emitted from the light emitting device module 110 may be transmitted to the interior of the light guide plate 120 through the lateral surface of the light guide plate 120.

The light emitting device module 110 may be located adjacent to the lateral surface of the first region 130. The lateral surface of the first region 130 may be located adjacent to the light emitting device module 110 in a direction perpendicular to the light emitting surface of the light emitting device package 112. The light emitting device module 110 may be spaced apart from the second region 140.

The at least one light emitting device package 112 may include a plurality of light emitting device packages 112, each of which includes a light emitting device (not shown) and may produce white light or light of a predetermined color. In one example, the light emitting device packages 112 may respectively include red, green and blue light emitting devices (not shown) to produce red, green and blue light. The light emitting devices (not shown) mounted in the light emitting device packages 112 may be light Emitting Diodes (LEDs), although the disclosure is not limited thereto.

The light emitting device package 112 may include a body (not shown) having a cavity, first and second electrodes (not shown) mounted to the body (not shown), a light emitting device (not shown) electrically connected to the first and second electrodes (not shown) and a sealing material (not shown) filled in the cavity. The sealing material (not shown) may contain a fluorescent substance (not shown).

The light emitting device packages 112 may be electrically connected to the printed circuit board 116. The light emitting device packages 112 may generate light upon receiving power from an external source and supply the light to the light guide plate 120. These light emitting device packages 112 may be arranged on the printed circuit board 116 to form a single row, although the disclosure is not limited thereto. Alternatively, the light emitting device packages 112 may take the form of an array of several rows. The light emitting device packages 112 may be mounted by a predetermined inclination. As such, arrangement of the light emitting device packages 112 may be arbitrarily determined.

The light emitting device (not shown) may be connected to a lead frame (not shown) by means of a wire terminal (not shown) or the like. A conductive pattern provided at an upper surface of the package body may substitute for the lead frame (not shown), or the light emitting device (not shown) may be directly mounted to the printed circuit board 116 using flip chip bonding, although the disclosure is not limited thereto.

The printed circuit board 116 may be configured to support the plurality of light emitting device packages 112. The printed circuit board 116 may be a Metal Printed Circuit Board (MPCB) having excellent radiation performance, or FR4 PCB, although the disclosure is not limited thereto. The MPCB may take the form of a stack of a metal base layer, insulating layer and copper etching circuit. The insulating layer (not shown) may be formed of epoxy or silicon resin charged with thermally conductive particles, in order to enhance thermal conductivity. The printed circuit board 116 may include an electrode pattern (not shown), and the electrode pattern (not shown) may be electrically connected to the light emitting device packages 112. In this case, power may be supplied to the light emitting device packages 112 via the electrode pattern (not shown).

The light guide plate 120 may include the first region 130, which may have the recess 170 indented in the lateral surface thereof adjacent to the light emitting device packages 112, and the second region 140, the upper surface of which is stepped from the first region 130.

An upper surface of the first region 130 may be stepped from an upper surface of the second region 140. A part of an upper surface of the light guide plate 120 may be raised to form the first region 130. In one example, the upper surface of the light guide plate 120 except for the second region 140, i.e. a part of the upper surface facing the light emitting device module 110 may be raised to form the first region 130. The upper surface of the first region 130 may have a tetragonal shape, such as a square shape or a rectangular shape, although the disclosure is not limited thereto.

A height difference T between the first region 130 and the second region 140 may be 0.5 mm to 1.0 mm. If the height of a stepped surface T is less than 0.5 mm, a thickness of the optical sheet 160 may be greater than the height of a stepped surface T, which may problematically increase a thickness of the backlight unit 100. If the height of a stepped surface T is greater than 1.0 mm, the light guide plate 120 may have an insufficient thickness, deteriorating light transmission efficiency.

The upper surface of the second region 140 may be stepped from an upper surface of the first region 130. To form the second region 140, a part of the upper surface of the light guide plate 120 may be indented relative to the first region 130. In one example, the first region 130 and the second region 140 may take the form of stairs and when viewed from the top, may take the form of a plurality of folded quadrangles.

A length of the second region 140 may be 20 to 80 times a length of the first region 130, with respect to a direction perpendicular to the lateral surface adjacent to the light emitting device module 110. If the length of the second region 140 is excessively short, a surface light source provided in the liquid crystal display apparatus (not shown) has a reduced area, which may deteriorate optical efficiency of a finished product. On the other hand, an excessively long length of the second region 140 may lower luminosity of the surface light source, causing deterioration in reliability.

The light guide plate 120 may be formed into a flat plate or a wedge plate formed of polymethylmethacrylate (PMMA) or transparent acrylic resin, or may be formed of glass, although the disclosure is not limited thereto. The transparent acryl resin is less deformable owing to high strength, has a light weight and exhibits high transmittance of visible light. In the edge light type backlight unit 100, the light emitting device module 110 may be located at an outer lateral surface of the backlight unit 100, such that an edge of the backlight unit 100 is brighter than the remaining region. The light guide plate 120, which exhibits high transmittance of visible light, may ensure uniform transmission of light throughout the entire area of the backlight unit 100, thereby preventing the edge of the backlight unit 100 from being brighter.

The light guide plate 120 may be provided at a rear surface (lower surface) thereof with ridges (not shown) to cause irregular reflection of light. The ridges (not shown) may have a predetermined shape in consideration of a distance from the light emitting device module 110 and the like. The ridges (not shown) may prevent incident light from the light emitting device module 110 from being concentrated on opposite ends of the surface of the light guide plate 120, thereby ensuring that the entire light guide plate 120 exhibits uniform light emission. As such, patterning the light guide plate 120 via formation of the ridges (not shown) may provide the entire panel of the liquid crystal display apparatus with planar light having high brightness and light uniformity.

The optical sheet 160 may be disposed to contact with a upper surface (upper surface) of the light guide plate 120. The optical sheet 160 may be disposed on the second region 140 having the indented upper surface. The optical sheet 160 may have an area less than that of the second region 140.

The upper surface of the light guide plate 120 may be stepped to form a vertical stepped surface 170 at the boundary of the first region 130 and the second region 140. Specifically, the first region 130 and the second region 140 have different thicknesses, causing the vertical stepped surface 170 at the boundary thereof. The optical sheet 160 may contact with the vertical stepped surface 170. The optical sheet 160 may be secured to the vertical stepped surface 170, although the disclosure is not limited thereto. The optical sheet 160 may have a volume less than that of the space indented in the light guide plate 120. Accordingly, the optical sheet 160 may be disposed on the second region 140 so as to achieve a slim design of the backlight unit 100 and may also be easily secured by the vertical stepped surface 170. The resulting reduced gap between the light guide plate 120 and the optical sheet 160 may prevent leakage of light, resulting in light emission reliability.

The optical sheet 160 may be comprised of a diffusive film 166, a prism film 164 and a protective film 162. The diffusive film 166 contains diffusive particles, such as beads and the like, and serves to diffuse light above the light guide plate 120. The prism film 164 is provided at an upper surface thereof with a prism pattern to condense light above the diffusive film 166. The protective film 162 is stacked on the prism film 164 to protect the prism film 164. The prism film 164 may contribute to enhanced brightness. The optical sheet 160 as described above may achieve desired brightness and viewing angle by diffusing and condensing light that has been directed from the light emitting device module 110 through the light guide plate 120.

The diffusive film 166 may disperse and condense light directed from the light emitting device module 110 or returned light from the prism film 164, providing brightness uniformity.

The diffusive film 166 may take the form of a thin sheet and may be formed of a transparent resin. In one example, the diffusive film 166 may be prepared by coating a polycarbonate or polyester film with a resin for light dispersion and light concentration.

The prism film 164 is prepared by imprinting a prism pattern vertically or horizontally on a surface of an optical film and serves to concentrate light emitted from the diffusive film 166.

The prism pattern of the prism film 164 may have a triangular cross section, in order to enhance light concentration efficiency. Excellent brightness may be accomplished when a right angle prism having a vertical angle of 90 degrees is used.

The protective film 162 may be stacked on the prism film 164 to protect the prism film 164.

The reflective sheet 150 is formed at a lower surface (rear surface) of the backlight unit 100 and serves to reflect light emitted from the light emitting device module 110 toward an upper surface (front surface) of the backlight unit 100 so as to enhance light transmission efficiency.

Referring to FIG. 1B, the light guide plate 120 may include the first region 130 and the second region 140, and the upper surface of the first region 130 may be stepped from the second region 140. The first region 130 may be a raised region of the upper surface of the light guide plate 120. In other words, the first region 130 may be raised from the upper surface of the light guide plate 120 so as to be located higher than the second region 140. The optical sheet 160 may be placed on the second region 140.

The optical sheet 160 may be comprised of the diffusive film (not shown), the prism film (not shown) and the protective film (not shown). The prism film (not shown) may enhance brightness.

The first region 130 may have a lateral surface facing the light emitting device module 110. In one example, the lateral surface of the first region 130 may face the light emitting surface of the light emitting device package 112.

The light guide plate 120 may be provided at a lateral surface 180 thereof adjacent to the light emitting device module 110 with the recess 170. The recess 170 may be indented in the lateral surface 180 of the light guide plate 120. That is, the light guide plate 120 may include the recess 170 indented in the lateral surface 180 of the first region 130.

The recess 170 may be indented in both the lateral surface and the rear surface of the light guide plate 120. The recess 170 may be angled or curved, although the disclosure is not limited thereto.

The recess 170 may be configured to accommodate the light emitting device module 110. As the light emitting device module 110 is accommodated in the recess 170, a gap between the light emitting device module 110 and the light guide plate 120 is reduced, which may ensure that light is effectively transmitted to the light guide plate 120 and also, may reduce the overall volume of the backlight unit 100, resulting in a slim design.

The lateral surface of the light guide plate 120 including the recess 170 may be connected to the printed circuit board 116. When the lateral surface of the light guide plate 120 including the recess 170 is connected to the printed circuit board 116, the backlight unit 100 may achieve durability.

A depth T1 of the recess 170 measured from the lateral surface of the light guide plate 120 adjacent to the light emitting device packages 112 may be in a range of 1 to 5 times a depth T2 of the recess 170 measured from the lower surface of the light guide plate 120. If the depth T1 of the recess 170 from the lateral surface of the light guide plate 120 is excessively small, arranging the light emitting device packages 112 in the recess 170 may be impossible, which makes it difficult to achieve a slim product design. If the depth T1 is excessively great, the gap between the light emitting device module 110 and the light guide plate 120 is increased, which may cause light loss.

Referring to FIG. 1B, a protrusion may be formed at a part of the upper surface of the second region 140, and the optical sheet 160 may come into contact at an end thereof with the protrusion.

The protrusion may be located adjacent to an edge where the upper surface and the lateral surface of the second region 140 meet. In one example, the protrusion may be located adjacent to an opposite edge of the stepped surface between the first region 130 and the second region 140.

In some embodiments, a plurality of protrusions 142 may be provided. These protrusions 142 may be arranged respectively at edges of the upper surface of the second region 140 so as to come into contact with respective lateral surfaces of the optical sheet 160.

The protrusions 142 may have a semispherical or cuboidal shape. These protrusions 142 may be provided to come into contact with the respective lateral surfaces of the optical sheet 160, thereby serving not only to ensure strong engagement between the optical sheet 160 and the light guide plate 120, but also to enhance stability of the backlight unit 100.

Figure 2A:
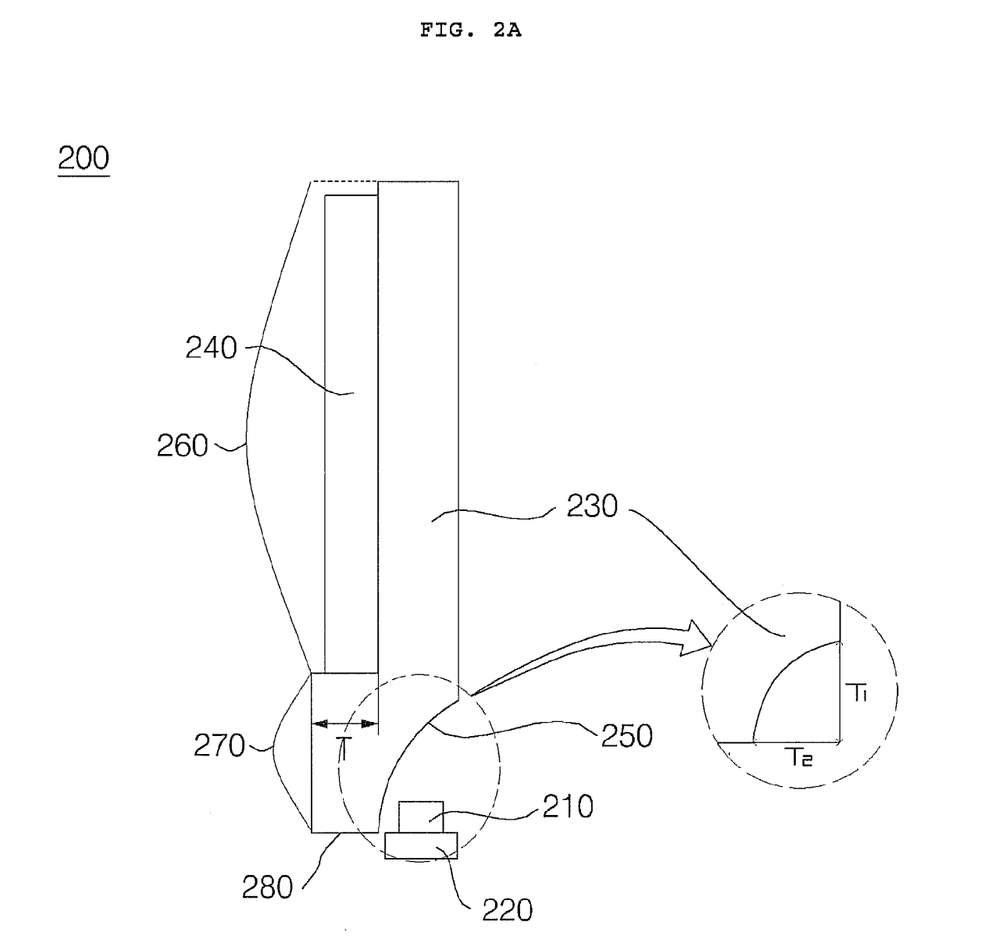
FIG. 2A is a sectional view showing a part of a backlight unit in accordance with an embodiment.
Figure 2B:
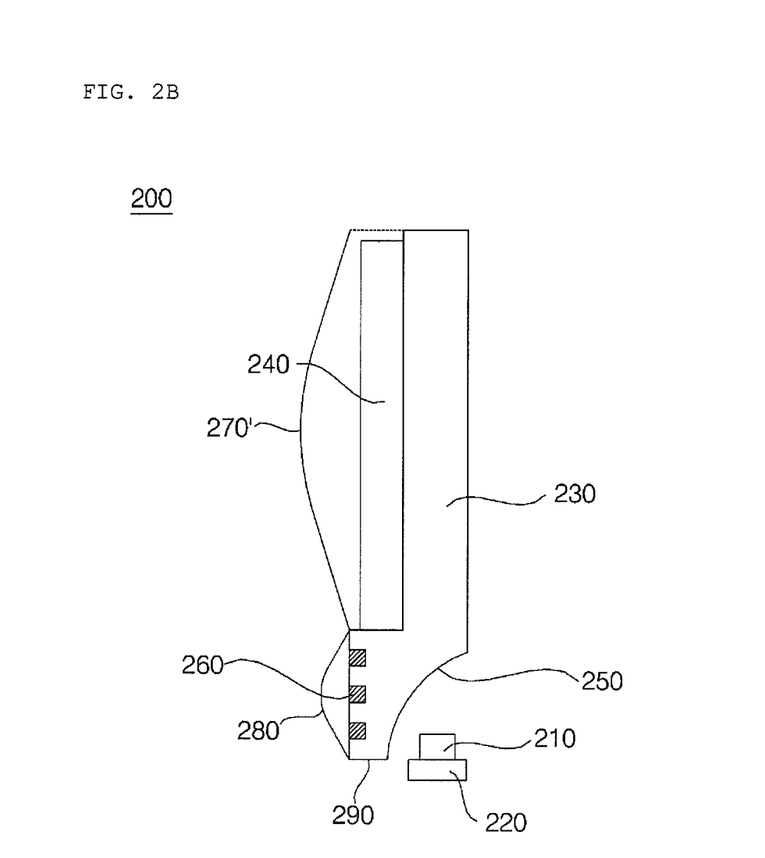
FIG. 2B is a sectional view showing a part of a backlight unit in accordance with an embodiment.
Figure 2C:
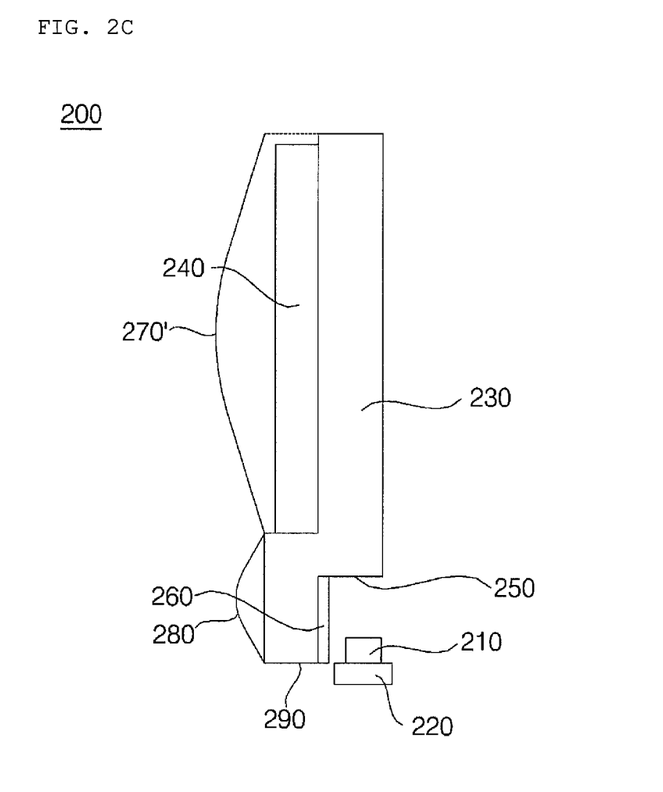
FIG. 2C is a sectional view showing a part of a backlight unit in accordance with an embodiment.
Figure 2D:
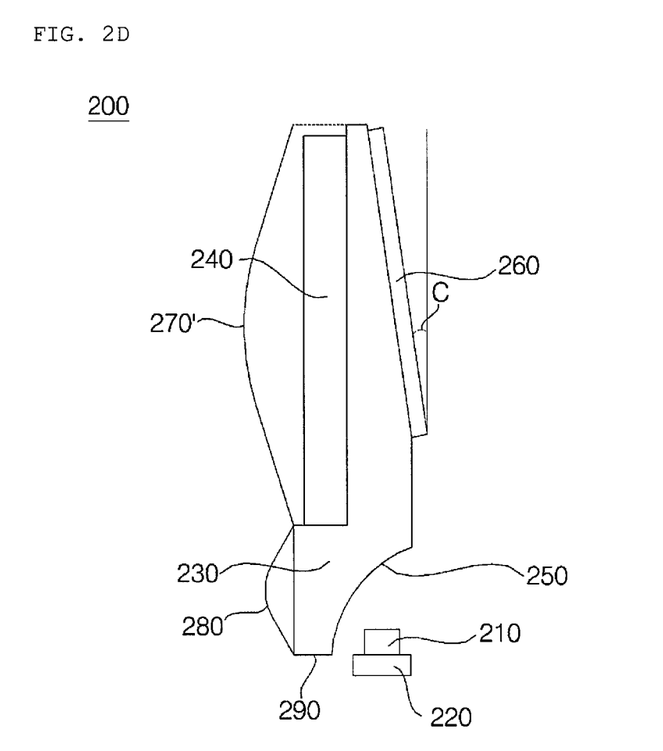
FIG. 2D is a sectional view showing a part of a backlight unit in accordance with an embodiment.

FIG. 2A is a sectional view showing a part of a backlight unit 200 in accordance with an embodiment, FIG. 2B is a sectional view showing a part of the backlight unit 200 in accordance with an embodiment, FIG. 2C is a sectional view showing a part of the backlight unit 200 in accordance with an embodiment, and FIG. 2D is a sectional view showing a part of the backlight unit 200 in accordance with an embodiment. A detailed description of the previously described configuration will be omitted hereinafter.

Referring to FIG. 2A, in the backlight unit 200 in accordance with the embodiment, a light guide plate 230 may include a first region 270 adjacent to a light emitting device package 210 and a second region 260 stepped from the first region 270, an optical sheet 240 may be placed on an upper surface of the second region 260, and a recess 250 may be indented in a lateral surface 280 of the first region 270.

The recess 250 may have a curvature. If a depth T1 of the recess 250 measured from the lateral surface 280 facing the light emitting device package 210 is equal to a depth T2 of the recess 250 measured from a lower surface of the light guide plate 230, the curvature of the recess 250 may correspond to the arc of a circle. However, if both the depth T1 and the depth T2 are different, the curvature of the recess 250 may correspond to the arc of an oval, although the disclosure is not limited thereto.

The depth T1 of the recess 250 measured from the lateral surface 280 facing the light emitting device package 210 may be in a range of 1 to 5 times the depth T2 from the lower surface of the light guide plate 230. If the depth T1 of the recess 250 measured from the lateral surface 280 facing the light emitting device package 210 is excessively small, arranging the light emitting device package 210 in the recess 250 may be impossible, which makes it difficult to achieve a slim product design. If the depth T1 is excessively great, a gap between a light emitting device module including the light emitting device package 210 and a printed circuit board 220 and the light guide plate 230 is increased, which may cause light loss.

As the light emitting device module including the light emitting device package 210 and the printed circuit board 220 is accommodated in the recess 250, the backlight unit 200 may have a slim design and the gap between the light emitting device module 210; 220 and the light guide plate 230 may be reduced, resulting in less light loss.

A height difference T of the stepped upper surface of the light guide plate 230 may be in a range of 0.5 mm to 1.0 mm. If the height difference T is less than 0.5 mm, a thickness of the optical sheet 240 may be greater than the height difference T, which may make it impossible to achieve a slim design of the backlight unit 200. If the height difference T is greater than 1.0 mm, a thickness of the light guide plate 230 may be reduced, which may deteriorate light transmission efficiency.

Referring to FIG. 2B, in the backlight unit 200 in accordance with the embodiment, the light guide plate 230 may include a first region 280 adjacent to the light emitting device package 210 and a second region 270' stepped from the first region 280, the optical sheet 240 may be placed on an upper surface of the second region 270', the recess 250 may be indented in a lateral surface of the first region 280, and an arbitrary pattern 260 may be formed in an upper surface of the first region 280. The recess 250 may be configured to accommodate the light emitting device module 210; 220.

The pattern 260 formed in the front surface of the first region 280 of the light guide plate 230 may take the form of horizontal lines, vertical lines, dots or the like, although the disclosure is not limited thereto. A part of light introduced into the light emitting device package 210 from the light emitting device package 210 may leak from the upper surface of the first region 280. The pattern 260 serves to diffract, refract and diffuse the light directed to the upper surface of the first region 280, thereby causing the light to be irregularly reflected to the interior of the light guide plate 230. Accordingly, the pattern 260 may ensure that light is uniformly emitted from the upper surface of the light guide plate 230, which may enhance brightness, uniformity and visibility of light over the entire panel surface of the display apparatus.

Referring to FIG. 2C, in the backlight unit 200 in accordance with the embodiment, the light guide plate 230 may include the first region 280 adjacent to the light emitting device package 210 and the second region 270' stepped from the first region 280, the optical sheet 240 may be placed on the upper surface of the second region 270', and the recess 250 may be indented in the lateral surface of the first region 280 and may be profiled to form a right angle. The light emitting device module 210; 220 may be accommodated in the recess 250. Additionally, a reflector 260 may be provided on a surface of the recess 250 parallel to the upper surface of the first region 280 of the light guide plate 230.

In consideration of the fact that light emitted from the light emitting device module 210; 220 may be incorrectly directed to the upper surface of the first region 280 of the light guide plate 230, the reflector 260 provided on the surface of the recess 250 parallel to the upper surface of the first region 280 may serve to reflect the light toward the body of the light guide plate 230. Accordingly, the reflector 260 ensures that light is uniformly emitted from the upper surface of the light guide plate 230, which may enhance brightness, uniformity and visibility of light over the entire panel surface of the display apparatus.

Referring to FIG. 2D, in the backlight unit 200 in accordance with the embodiment, the light guide plate 230 may include the first region 280 adjacent to the light emitting device package 210 and the second region 270' stepped from the first region 280, the optical sheet 240 may be placed on the upper surface of the second region 270', and the recess 250 may be indented in the lateral surface of the first region 280 and may be profiled to have a curvature. The light emitting device module 210; 220 may be accommodated in the recess 250, and a reflective sheet 260 may be attached to a lower surface of the light guide plate 230.

A lower surface of the second region 270' may be inclined by an angle C such that a thickness of the light guide plate 230 is reduced with increasing distance from the first region 280. Providing the lower surface of the light guide plate 230 with the angle C may ensure that incident light from the light emitting device package 210 is uniformly emitted from the entire surface of the light guide plate 230.

The reflective sheet 260 may be provided at the lower surface of the light guide plate 230. When light emitted from the light emitting device module 210; 220 is introduced through a light entrance portion 290 of the light guide plate 230 and is directed to the lower surface of the light guide plate 230, the reflective sheet 260 may serve to reflect the light toward the upper surface of the light guide plate 230, which may increase light emission efficiency.

The reflective sheet 260 may be provided even if the lower surface of the light guide plate 230 is inclined. As the reflective sheet 260 is attached to the light guide plate 230, a volume of which is reduced due to the inclined lower surface, a slim product design may be accomplished.

Figure 3:
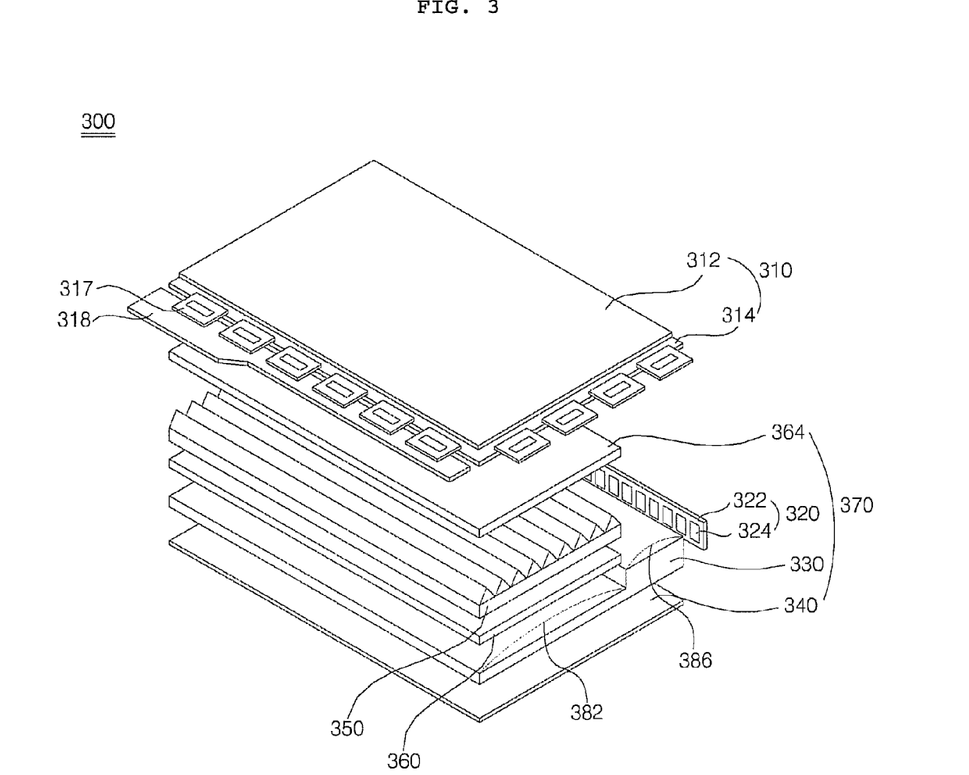
FIG. 3 is an exploded perspective view showing a liquid crystal display apparatus including a backlight unit in accordance with an embodiment.

FIG. 3 is an exploded perspective view showing a liquid crystal display apparatus 300 including a backlight unit 370 in accordance with an embodiment. A detailed description of the above described configuration will be omitted hereinafter.

FIG. 3 shows the edge light type liquid crystal display apparatus 300, which may include a liquid crystal display panel 310 and the backlight unit 370 to supply light to the liquid crystal display panel 310.

The light crystal display panel 310 may display an image using light supplied from the backlight unit 370. The liquid crystal display panel 310 may include a color filter substrate 312 and a thin film transistor substrate 314, which are arranged to face each other with liquid crystals interposed therebetween.

The color filter substrate 312 may realize the color of the image displayed via the liquid crystal display panel 310.

The thin film transistor substrate 314 is electrically connected to a printed circuit board 318, on which a plurality of circuit elements is mounted, by means of a drive film 317. The thin film transistor substrate 314 may apply drive voltage, provided by the printed circuit board 318, to the liquid crystals in response to a drive signal transmitted from the printed circuit board 318.

The thin film transistor substrate 314 may include pixel electrodes and thin film transistors in the form of thin films formed on another substrate formed of a transparent material, such as glass, plastic or the like.

The backlight unit 370 includes a light emitting device module 320 to emit light, a light guide plate 330 to change light emitted from the light emitting device module 320 into planar light and transmit the planar light to the liquid crystal display panel 310, a plurality of optical sheets 350, 360 and 364 to achieve uniformity in brightness distribution and improve vertical incidence of the light having passed through the light guide plate 330, and a reflective sheet 340 to reflect light directed toward the rear surface of the light guide plate 330 to the front surface of the light guide plate 330. The light emitting device module 320 may include a plurality of light emitting device packages 324 and a printed circuit board 322 on which the plurality of light emitting device packages 324 is mounted to define an array.

In the embodiment, the light guide plate 330 included in the backlight unit 370 may include a first region 386, which has a recess (not shown) indented in a lateral surface thereof adjacent to the light emitting device packages 324, and a second region 382, an upper surface of which is stepped from the first region 386. The optical sheets 350, 360 and 364 may be placed on an upper surface of the second region 382. As the optical sheets 350, 360 and 364 are mounted on the second region 382, a gap between the optical sheets 350, 360 and 364 and the light guide plate 330 is reduced, which may reduce light loss.

The lateral surface of the light guide plate 330 adjacent to the light emitting device packages 324 may be provided with the recess (not shown). The recess (not shown) may be angled or may have a curvature, although the disclosure is not limited thereto.

The light emitting device module 320 may be accommodated in the recess (not shown). As the light emitting device module 320 is accommodated in the recess (not shown), a gap between the light emitting device module 320 and the light guide plate 330 is reduced, which may ensure that light is effectively transmitted to the light guide plate 330 and may reduce the overall volume of the backlight unit 300, resulting in a slim design.

Figure 4:
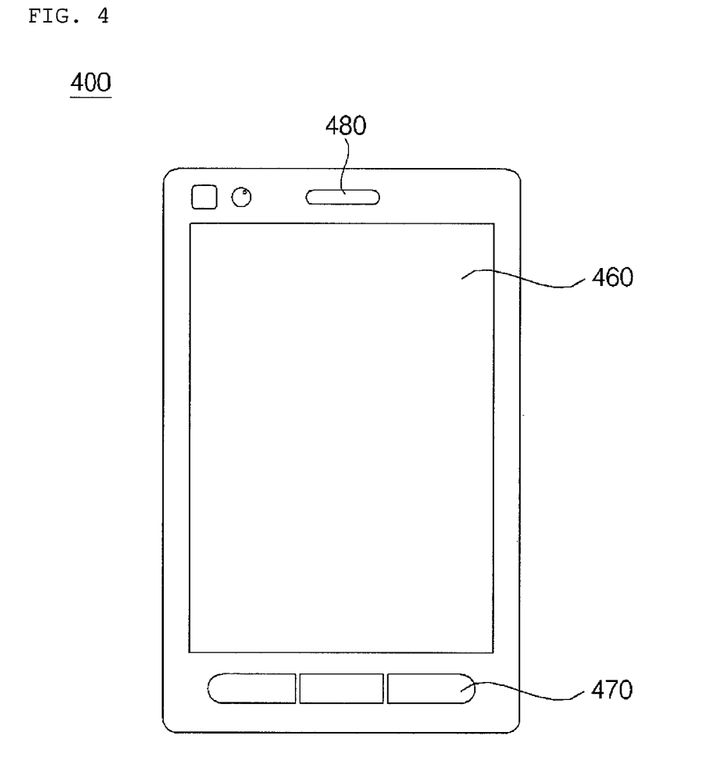
FIG. 4 is a conceptual view showing an electronic appliance including a backlight unit in accordance with an embodiment.

FIG. 4 is a conceptual view showing an electronic appliance including a backlight unit (not shown) in accordance with an embodiment.

Referring to FIG. 4, a mobile communication terminal 400 is shown as one example of the electronic appliance including the backlight unit (not shown) in accordance with the embodiment, although the disclosure is not limited thereto.

The mobile communication terminal 400 in accordance with the embodiment may include a receiver 480 to output, e.g., voice of a call partner, a screen 460 serving as a display device, an operating switch 470 to start or end a call, and a camera 410 used for a video call or photographing. The screen 460 may include, e.g., a touch panel and may serve as an input device as well as a display device.

A liquid crystal display apparatus (not shown) may be provided inside the screen 460 and may include a backlight unit (not shown).

The backlight unit (not shown) in accordance with the embodiment may include a light emitting device package (not shown), a light guide plate (not shown) which includes a first region (not shown) having a recess (not shown) indented in a lateral surface thereof adjacent to the light emitting device package (not shown) and a second region (not shown), an upper surface of which is stepped from the first region (not shown), and an optical sheet (not shown) placed on the upper surface of the second region (not shown). As the optical sheet (not shown) is mounted on the second region (not shown), a gap between the optical sheet (not shown) and the light guide plate (not shown) is reduced, which may reduce light loss.

The lateral surface of the light guide plate (not shown) adjacent to the light emitting device package (not shown) may be provided with the recess (not shown). The recess (not shown) may be angled or may have a curvature, although the disclosure is not limited thereto.

A light emitting device module (not shown) may be accommodated in the recess (not shown). As the light emitting device module (not shown) is accommodated in the recess (not shown), a gap between the light emitting device module (not shown) and the light guide plate (not shown) is reduced, which may ensure that light is effectively transmitted to the light guide plate (not shown) and may reduce the overall volume of the backlight unit (not shown), resulting in a slim design.

As is apparent from the above description, in a backlight unit in accordance with an embodiment, an optical sheet may be mounted on a part of a light guide plate having a lower height than the remaining part, which may provide a slim product design.

A gap between the light guide plate and the optical sheet may be reduced, resulting in reduction in light loss and uniform light emission of the backlight unit. Moreover, a stepped surface of the light guide plate may allow the optical sheet to be easily secured to the light guide plate.

In the backlight unit in accordance with an embodiment, a light emitting device module is accommodated in a recess of the light guide plate, which may provide a slim product design and further reduce light loss.

In the backlight unit in accordance with an embodiment, the light guide plate has a stepped surface, thus having a reduced weight, which may enhance productivity and processing convenience of the light guide plate.

Furthermore, in the backlight unit in accordance with an embodiment, a reflector is provided at a light entrance portion of the light guide plate, which may ensure that incident light from the light emitting device module is uniformly distributed throughout the light guide plate.

Although embodiments have been disclosed with reference to a number of illustrative embodiments thereof, it should be understood that numerous other modifications and applications may be devised by those skilled in the art that will fall within the intrinsic aspects of the embodiments. More particularly, various variations and modifications are possible in concrete constituent elements of the embodiments. In addition, it is to be understood that differences relevant to the variations and modifications fall within the spirit and scope of the present disclosure defined in the appended claims.

What is claimed is:

1. A backlight unit comprising:
   a light guide plate comprising a first region and a second region formed adjacent to the first region, the second region having an upper surface that is spaced apart from an upper surface of the first region such that the first and second regions of the light guide plate are stepped, wherein a lower surface of the light guide plate is oriented at an incline with resect to the upper surface of the second region of the light guide plate;
   a recess formed in a lateral surface of the light guide plate;
   a light emitting device module provided at the recess formed in the light guide plate; and
   an optical sheet disposed on the upper surface of the second region of the light guide plate.

2. The backlight unit according to claim 1, wherein the recess is indented in both a lower surface and the lateral surface of the light guide plate.

3. The backlight unit according to claim 1, wherein the optical sheet contacts a stepped surface of the light guide plate that extends between the upper surface of the first region and the upper surface of the second region.

4. The backlight unit according to claim 1, wherein a height of a stepped surface between the first region and the second region is in a range of 0.5 mm to 1.0 mm.

5. The backlight unit according to claim 1, wherein the recess comprises at least one surface that is parallel to the upper surface of the light guide plate, and a reflector is received on the at least one surface of the recess.

6. The backlight unit according to claim 1, wherein a contour of the recess is curved.

7. The backlight unit according to claim 1, wherein the light emitting module comprises a light emitting device package disposed on a printed circuit board and received in the recess formed in the light guide plate.

8. The backlight unit according to claim 2, wherein a depth of the recess from the lower surface of the light guide plate is 1 to 5 times a depth of the recess from the lateral surface of the light guide plate.

9. The backlight unit according to claim 1, wherein a length of the second region is 20 to 80 times a length of the first region, with respect to a direction perpendicular to the lateral surface of the light guide plate which the recess is formed.

10. The backlight unit according to claim 1, further comprising a pattern formed on the upper surface of the first region.

11. The backlight unit according to claim 1, further comprising a reflective sheet disposed on the lower surface of the second region of the light guide plate.

12. A backlight unit, comprising:
    a light guide plate comprising a first region and a second region, an upper surface of the second region being spaced apart from an upper surface of the first region, with a step surface extending therebetween, and a lower surface of the second region being oriented at an incline with respect to the upper surface of the second region;
    an optical sheet provided on the upper surface of the second region, with a lateral side of the optical sheet being positioned adjacent to the step surface of the light guide plate; and
    a light emitting device module coupled to the light guide plate so as to emit light to the light guide plate.

13. The backlight unit according to claim 12, further comprising a recess formed in a lateral surface of the light guide plate, the recess comprising a curved surface or at least one planar surface, wherein the light emitting device module is received in the recess.

14. The backlight unit according to claim 12, wherein a height difference between the first region and the second region is 0.5 mm to 1.0 mm.

15. The backlight unit according to claim 12, wherein a height of the optical sheet is less than a height of the step surface extending between the upper surface of the first region and the upper surface of the second region of the light guide plate.

16. The backlight unit according to claim 12, further comprising a reflective sheet received on the inclined lower surface of the light guide plate.

17. The backlight unit according to claim 12, further comprising a pattern formed on an upper surface of the first region of the light guide plate.

18. A backlight unit, comprising:
    a light guide plate including a first region and a second region extending from the first region, a thickness of the second region being different from a thickness of the first region such that an upper surface of the second region is stepped from an upper surface of the first region;
    a recess formed in a lateral side of the light guide plate and configured to receive a light emitting module;
    an optical sheet provided on the upper surface of the second region; and
    a protrusion formed at an end portion of the upper surface of the second region, wherein an end of the optical sheet contacts the protrusion.

19. The backlight unit according to claim 18, wherein the protrusion has a semispherical or cuboidal shape.

* * * * *